A. G. M. MICHELL.
METHOD AND APPARATUS FOR DETERMINING VISCOSITY.
APPLICATION FILED JAN. 29, 1918.

1,398,878.

Patented Nov. 29, 1921.
2 SHEETS—SHEET 1.

A. G. M. MICHELL.
METHOD AND APPARATUS FOR DETERMINING VISCOSITY.
APPLICATION FILED JAN. 29, 1918.

1,398,878.

Patented Nov. 29, 1921.
2 SHEETS—SHEET 2.

UNITED STATES PATENT OFFICE.

ANTHONY GEORGE MALDON MICHELL, OF MELBOURNE, VICTORIA, AUSTRALIA.

METHOD AND APPARATUS FOR DETERMINING VISCOSITY.

1,398,878.  Specification of Letters Patent.  Patented Nov. 29, 1921.

Application filed January 29, 1918. Serial No. 214,407.

*To all whom it may concern:*

Be it known that I, ANTHONY GEORGE MALDON MICHELL, a subject of the King of Great Britain, and resident of 450 Collins street, Melbourne, in the State of Victoria, Commonwealth of Australia, civil engineer, have invented Methods and Apparatus for Determining Viscosity, of which the following is a specification.

Existing instruments for the determination of the viscosity of fluids suffer from the disadvantage that they are for the most part fragile, complicated and difficult to clean, and require considerable skill and delicacy of manipulation and observation.

The object of the present invention is to provide a new and extremely simple method for determining viscosity and the means for carrying out same can be of simple and non-fragile form and is intended principally for making rapid determinations of the viscosity of oils and other liquids under workshop conditions.

Furthermore the method possesses the advantage that it is applicable to the approximate determination of the viscosity of liquids of widely different viscosities without requiring corrections for the kinetic energy of flow of the liquid tested, or its surface tension as is necessary with existing methods and instruments.

According to my invention I determine the viscosity of fluids by measuring the period of time occupied between the moments of contact and separation of two closely adjacent and substantially fitting surfaces having an interposed film of the fluid, a constant force being applied to separate the two surfaces, the period occupied by such separation varying directly as the viscosity of the fluid. As a means for use in carrying out the method defined, an instrument may be employed comprising two closely fitting parts such as a cup and a ball, the former constituting a seating for the latter, a film of the fluid, the viscosity of which is to be measured, being placed in the cup before the ball is inserted.

Figure 1:
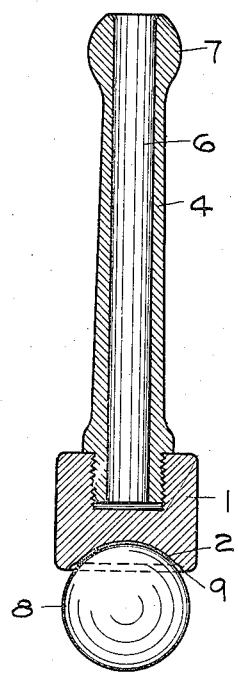
Figure 2:
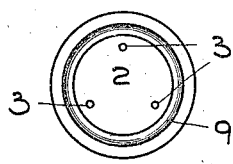
Figure 3:
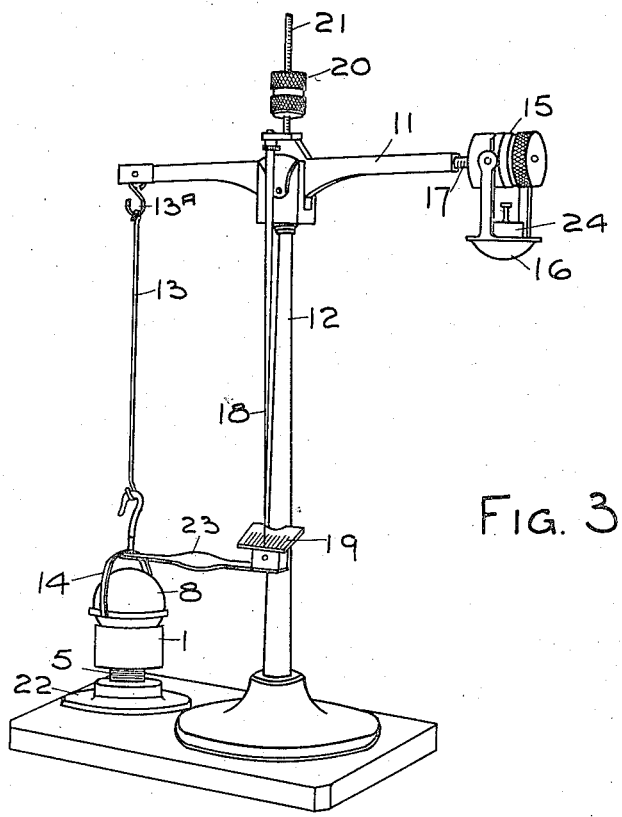
Figure 4:
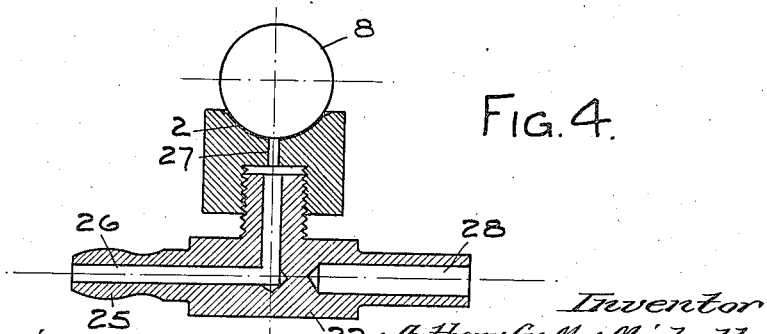

In the accompanying drawings, Figures 1 and 2 are a longitudinal section and an end view respectively of one simple means for use in carrying out the invention, Fig. 3 being a side view of a complete apparatus employing said means while Fig. 4 illustrates a modification of details.

In the simple form of the instrument, shown in Figs. 1 and 2, the cup 1, having the concave surface 2, is provided with a stem or handle 4, which is bored longitudinally with a hole 6 extending into the metal of the cup 1 to within a short distance of the spherical surface 2.

The hollow surface of the cup is furnished at three points, preferably located at the angles of an equilateral triangle, with three slight projections 3 from the surface. The ball 8, which may be conveniently about one inch in diameter, a selected steel bearing ball of this size being suitable for use with oils, fits the spherical surface 2. The projections 3 from the surface of the cup may be 1 or 2 millimeters in diameter, and their relief from the general spherical surface about one-hundredth of a millimeter in the case of a viscometer to be used for ordinary lubricating oils.

In order to protect the spherical surface of the cup from injury, and for another reason stated below, its edge is preferably recessed all around in a groove 9 having a width and depth of 1 or 2 millimeters.

The cup 1, if of mild steel or cast iron, which are suitable for use with oils, after being turned to the required form and accurately fitted to the ball 8 by scraping or grinding, may have the projections 3 formed upon its concave surface by striking it under a drop-hammer with an accurately formed spherical-faced die having holes corresponding to such projections. This process is found to be effective not only in the case of mild steel but also with fine grained cast iron of good quality. The force of the hammer blow is adjusted by trial to form the projections with the required relief. If of mild steel the cup is then finished by hardening on the concave surface including the three projections thereon by the ferro-prussiate or other suitable method. It is preferable to harden the concave surface only, in order to avoid accidental magnetization of the cup which would interfere with the accuracy of the use of the instrument. Alternatively, and especially for use with acids or other corrosive solutions, the cup 1 and ball 8 are formed of glass, and the projections on the spherical surface may be formed by etching the surface 2 with nitric or hydro-fluoric acid or other suitable agent, the spots on which the projections are to be formed being protected by wax or the like. The three projections may be finally scraped or ground until the action of the instrument is found by trial to take place in the desired time.

In the use of this instrument the cup 1 and handle 4 are held vertically in the hand by the knob 7 with the spherical surface 2 of the cup downward, and the ball 8 is caused to adhere to the latter surface by a film of the liquid to be tested which is placed between them, the ball and cup being firmly pressed together. A thermometer is inserted in the hole 6 with its bulb in contact with the metal of the cup, to determine the temperature of the film of liquid. The time, determined conveniently by a stop-watch, taken for the ball 8 to become detached under the action of gravity, is a measurement of the viscosity of the liquid. As the ball falls during the act of measurement, the liquid retained in the groove 9 is drawn upon to feed the liquid film of growing thickness between the ball and cup, and, the quantity of liquid retained in the groove 9 being relatively large compared to the quantity in the capillary space between the substantially parallel surfaces of the cup and ball, the groove remains practically filled with oil, and the surface tension of the surface thereof having a considerable radius of curvature, is without serious effect on the effective weight of the ball.

In order to adapt the apparatus to liquids of high or low viscosity, the force of gravity on the ball may be increased or diminished by the use of springs or the like. In certain cases the cup may be inverted, the ball being lifted upward from it, instead of being allowed to fall downward as above described.

In the apparatus illustrated in Fig. 3 a construction of this latter class is employed. In this form of the instrument a sensitive balance comprising a beam 11 balanced by knife edges on the pillar 12 carries at one end of said beam the ball 8 suspended from a knife edge by means of the links 13 and 13ᴬ and stirrup 14 and at the opposite end a counter-balance weight 15 from which is hung by knife edges the scale pan 16. The balance weight 15 is adjustable along the length of the beam 11 being threaded on the screw 17. The beam is provided in the usual way with a pointer 18 moving over a scale 19 attached to the pillar 12 and with an adjustable weight 20 threaded on the screw 21 for varying the sensitiveness of the balance. The ball 8 is suspended by means of the stirrup 14 directly over the cup 1, which is of similar construction to the cup shown in Figs. 1 and 2 being fastened by screw 5 to the base block 22 attached to the base plate of the balance. A spring finger 23 is attached to the pillar 12 in such a position that it can be pressed down so as to bear on the top of the ball 8, or allowed to rise by its elasticity out of contact therewith, as desired. The balance may be inclosed in a glass shade or case not shown.

The method of using the apparatus shown in Fig. 3 is as follows:—The spring 23 being out of contact with the ball 8, the weight 15 with the scale pan 16 empty is adjusted on the screw 17 for equilibrium with the pointer 18 on its central position. The ball 8 is then swung clear of the cup 1 and a small quantity of the liquid to be tested is placed in the hollow surface of the cup. Being returned to its normal position, the ball 8 is then pressed down into the cup 1 by means of the spring finger 23 so as to establish contact between the ball and the projections on the cup and to fill the annular groove of the cup with liquid displaced from the spherical hollow. A suitable weight 24 having then been placed in the scale pan 16, the spring 23 is released, whereupon the ball 8, being overbalanced to the extent of the weight 24, tends to rise out of contact with the cup 1, its motion being retarded by the viscosity of the liquid. The time from the moment when the spring 23 is released until the ball 8 begins to rise perceptibly, as indicated by the motion of the pointer 18 over the scale 19, then determines the viscosity of the liquid and the instrument may be calibrated by use with liquids of known viscosity as already described. It is convenient to assign the lengths of the two arms of the balance beam 11 so that the combined weight of the adjustable balance weight 15 and the attached scale pan 16 amounts to an even number of grams. The weight 24 selected from the usual series of gram weights is then the equivalent of a simple fraction of the weight of the ball, and the calculations necessary for the calibration of the instrument are thus simplified.

The apparatus shown in Fig. 3 with the modification illustrated in Fig. 4 may be applied for the approximate determination of the viscosity of gases. For this purpose the base block 22 is provided with a branch pipe 25 for the attachment of an india-rubber tube or the like, the block 22 and cup 1 being drilled with holes 26 and 27 respectively through which the gas to be tested is admitted from the source of supply to the capillary space between the cup 1 and the ball 8. When used for this purpose, the projections 3 from the cup 2 are preferably made with lower relief than for testing the viscosity of liquids and the weight 24 also reduced in order to lengthen the time of measurement for a sufficiently accurate determination. The calibration of the modified instrument may be made by means of any gas whose viscosity is known, e. g. air. The temperature of the fluid under test in the instruments shown in Figs. 3 and 4 may be determined by laying a thermometer alongside the cup 1 on the base of the instrument or preferably by providing a hollow branch 28 on the base block 22, as shown in Fig. 4, into which a thermometer can be inserted.

The means for carrying out the invention are not restricted to the precise forms of the instrument above described, as the two essential members may be varied in construction, the sole characteristic feature being the adaptability of the instrument for use in measuring the time of separation of two determinate and closely fitting surfaces under the action of a definite force, such separation being opposed by the viscous flow of a film of the fluid between the said two surfaces.

I claim:

1. The herein described method of determining the viscosity of a fluid which consists in measuring the period of time occupied for the complete separation, under the action of a predetermined force, of two closely adjacent surfaces having interposed between the same a film of the fluid of determinate thickness.

2. An apparatus for determining the viscosity of liquids comprising two elements having closely adjacent opposed surfaces adapted to receive between them a film of fluid of determinate thickness, said apparatus having provision whereby said members may be subjected to a constant force to separate said surfaces.

3. An apparatus for determining the viscosity of fluids comprising two elements having closely adjacent opposed surfaces adapted to receive between the same a film of fluid of determinate thickness, in combination with means for applying a known force for measurable time to separate said surfaces.

4. An apparatus for determining the viscosity of fluids comprising two elements having closely adjacent opposed surfaces adapted to receive between the same a film of fluid and means for determining the thickness of said film, in combination with means for applying a constant force for measurable time to separate said surfaces.

5. An apparatus for determining the viscosity of fluids comprising a pair of separable elements having closely adjacent, substantially parallel surfaces adapted to receive between them a film of fluid, and means for determining the spacing of said surfaces and the consequent thickness of said film, said apparatus having provision whereby said elements may be subjected to a force tending to separate said surfaces.

6. An apparatus for determining the viscosity of fluids comprising two elements having closely adjacent, substantially parallel surfaces adapted to receive between them a film of fluid, one of said surfaces being provided with projections which determine the thickness of said fluid film, said apparatus having provision whereby said elements may be subjected to a force tending to separate said surfaces.

7. An apparatus for determining the viscosity of fluids, comprising a pair of separable elements having closely adjacent, substantially parallel surfaces adapted to receive between them a film of fluid, and means for determining the spacing of said surfaces and the consequent thickness of said film, said apparatus having provision whereby said elements may be subjected to a constant force tending to separate said surfaces.

8. An apparatus for determining the viscosity of fluids, comprising a pair of separable elements having closely adjacent, substantially parallel surfaces adapted to receive between them a film of fluid, and means for determining the spacing of said surfaces and the consequent thickness of said film, in combination with means for applying to said elements a known force for measurable time to separate said surfaces.

9. An apparatus for determining the viscosity of fluids, comprising a pair of separable elements having closely adjacent, substantially parallel surfaces adapted to receive between them a film of fluid, one of said surfaces being provided with projections which determine the thickness of said fluid, said apparatus having provision whereby said elements may be subjected to a constant force tending to separate said surfaces.

10. In an apparatus for determining the viscosity of fluids, a pair of separable elements having closely adjacent surfaces, one of said elements being provided with a recess communicating with the space between said surfaces and constituting a reservoir adapted to retain fluid and feed the same to said space as said elements are separated.

11. In an apparatus for determining the viscosity of fluids, a pair of separable elements having closely adjacent surfaces, one of said elements being provided with a continuous groove communicating throughout its length with the space between said surfaces and constituting a reservoir for supplying fluid to said space.

12. In an apparatus for determining the viscosity of fluids, a balance having means for equilibrating same, in combination with two elements having closely adjacent surfaces adapted to receive between the same an interposed fluid film of determinate thickness, means for bringing said surfaces together and means including said balance for applying a definite force acting to separate said surfaces.

13. In an apparatus for determining the viscosity of fluids, the combination with two elements having closely adjacent surfaces adapted to receive between the same an interposed fluid film, of means for determining the thickness of said film and means including a balance for applying a constant force to separate said elements.

14. An apparatus for determining the viscosity of fluids comprising a pair of elements having closely adjacent surfaces adapted to receive a film of fluid of a definite thickness between them, one of said elements being capable of acting solely under the influence of tension to effect separation of said surfaces in a measurable period of time, and means for definitely fixing the spacing of said surfaces and the consequent thickness of said film.

15. An apparatus for determining viscosity comprising a member having a substantially spherical concave surface surrounded by a groove and provided with projections, and a second member having a substantially spherical convex surface adapted substantially to fit said first named surface and to engage the projections thereon.

16. An apparatus for determining viscosity comprising, in combination, a stationary lower member, an upper member having an under surface closely adjacent the upper surface of said lower member, said surfaces being adapted to receive between them a film of fluid, means for determining the thickness of said film, and means for applying a determinate force tending to lift said upper member from said lower member.

17. An apparatus for determining viscosity comprising, in combination, a base block, a member having an under surface closely adjacent the upper surface of said base block, said surfaces being adapted to receive between them a film of fluid, means for determining the thickness of said film, and a balance comprising a beam connected at one end with said member and having at the opposite end a counterpoise for said member.

18. An apparatus for determining viscosity comprising, in combination, a base block having a concave upper surface surrounded by a groove and provided with projections, a member having a convex surface adapted substantially to fit said first named surface and to engage the projections thereon, and a balance comprising a beam connected at one end with said member and having at the opposite end a counterpoise for said member and a scale pan.

ANTHONY GEORGE MALDON MICHELL.